(12) United States Patent
Wang et al.

(10) Patent No.: US 12,347,136 B2
(45) Date of Patent: Jul. 1, 2025

(54) METHOD OF HIGH-PRECISION 3D RECONSTRUCTION OF EXISTING RAILWAY TRACK LINES BASED ON UAV MULTI-VIEW IMAGES

(71) Applicant: CHINA RAILWAY DESIGN CORPORATION, Tianjin (CN)

(72) Inventors: Guangshuai Wang, Tianjin (CN); Jiwei Deng, Tianjin (CN); Wenfeng Gao, Tianjin (CN); Hai Zhao, Tianjin (CN); Guanjun Zhang, Tianjin (CN); Kai Wang, Tianjin (CN); Yingjie Zhang, Tianjin (CN); Huxiao Nie, Tianjin (CN); Wenteng Zhang, Tianjin (CN); Liang Yue, Tianjin (CN); Yuhui Ge, Tianjin (CN); Shuai Gao, Tianjin (CN); Luoming Zhao, Tianjin (CN)

(73) Assignee: CHINA RAILWAY DESIGN CORPORATION, Tianjin (CN)

( * ) Notice: Subject to any disclaimer, the term of this patent is extended or adjusted under 35 U.S.C. 154(b) by 363 days.

(21) Appl. No.: 18/063,273

(22) Filed: Dec. 8, 2022

(65) Prior Publication Data
US 2023/0112991 A1 Apr. 13, 2023

Related U.S. Application Data

(63) Continuation of application No. PCT/CN2021/129311, filed on Nov. 8, 2021.

(30) Foreign Application Priority Data

Apr. 20, 2021 (CN) .......................... 202110424507.X

(51) Int. Cl.
G06T 7/73 (2017.01)
G01C 11/34 (2006.01)
G06T 11/00 (2006.01)

(52) U.S. Cl.
CPC ................ G06T 7/73 (2017.01); G01C 11/34 (2013.01); G06T 11/006 (2013.01); G06T 2207/10032 (2013.01); G06T 2207/30172 (2013.01)

(58) Field of Classification Search
CPC ..................... G06T 7/73; G06T 11/006; G06T 2207/10032; G06T 2207/30172;
(Continued)

(56) References Cited

U.S. PATENT DOCUMENTS

2017/0206648 A1  7/2017  Marra et al.

FOREIGN PATENT DOCUMENTS

CN  106248053 A  12/2016
CN  106780729 A * 5/2017 ............. G06T 17/05
(Continued)

OTHER PUBLICATIONS

Kurz, Franz, et al. "Deep learning segmentation and 3D reconstruction of road markings using multiview aerial imagery." ISPRS International Journal of Geo-Information 8.1 (2019): 47. (Year: 2019).*

(Continued)

Primary Examiner — Molly Wilburn
Assistant Examiner — Emma N. Luke
(74) Attorney, Agent, or Firm — Westbridge IP LLC

(57) ABSTRACT

Disclosed is a method of high-precision 3D reconstruction of existing railway track lines based on UAV multi-view images, including: acquiring initial data, acquiring a UAV image rail top centerline, calculating a rail top centerline based on a nonlinear least squares method, and calculating three-dimensional coordinates of the rail centerline. Based on the multi-view geometry principle in computer vision and photogrammetry, object space coordinates of the line can be directly calculated by using image information, which does (Continued)

not require outdoor workers to work online and can effectively improve the safety of railway operation line surveying and mapping. Therefore, this method has important engineering application value and application prospect.

8 Claims, 4 Drawing Sheets

(58) Field of Classification Search
CPC .......... G06T 7/70; G01C 11/34; G01C 11/06; G01C 11/00; Y02T 10/40
See application file for complete search history.

(56) References Cited

FOREIGN PATENT DOCUMENTS

| CN | 107792115 A | | 3/2018 | |
|---|---|---|---|---|
| CN | 110986878 A | | 4/2020 | |
| CN | 111062958 A | * | 4/2020 | ............... G06T 7/13 |
| CN | 111429498 A | | 7/2020 | |
| CN | 111540052 A | | 8/2020 | |
| CN | 112461205 A | | 3/2021 | |
| CN | 112597664 A | | 4/2021 | |
| CN | 113155098 A | | 7/2021 | |
| JP | 2016061674 A | | 4/2016 | |
| WO | 2019106623 A1 | | 6/2019 | |

OTHER PUBLICATIONS

Sahebdivani, Shima, Hossein Arefi, and Mehdi Maboudi. "Rail track detection and projection-based 3D modeling from UAV point cloud." Sensors 20.18 (2020): 5220. (Year: 2020).*

Cantisani, Giuseppe, and Giulia Del Serrone. "Procedure for the identification of existing roads alignment from georeferenced points database." Infrastructures 6.1 (2020): 2. (Year: 2020).*

Marinelli, Giuseppe, et al. "Mobile mapping systems and spatial data collection strategies assessment in the identification of horizontal alignment of highways." Transportation Research Part C: Emerging Technologies 79 (2017): 257-273. (Year: 2017).*

First Office Action issued in counterpart Chinese Patent Application No. 202110424507.X, dated Mar. 23, 2022.

International Search Report issued in corresponding PCT Application No. PCT/CN2021/129311, dated Feb. 10, 2022.

* cited by examiner

METHOD OF HIGH-PRECISION 3D RECONSTRUCTION OF EXISTING RAILWAY TRACK LINES BASED ON UAV MULTI-VIEW IMAGES

CROSS-REFERENCE TO RELATED APPLICATIONS

This application is a continuation of International Application No. PCT/CN2021/129311, filed on Nov. 8, 2021, which claims priority to Chinese Patent Application No. 202110424507.X, filed on Apr. 20, 2021, the entire disclosures of which are incorporated herein by reference.

TECHNICAL FIELD

The present application relates to the technical field of surveying and mapping of existing railway lines, in particular to a method of high-precision three-dimensional (3D) reconstruction of existing railway track lines based on unmanned aerial vehicle (UAV) multi-view images.

BACKGROUND

UAV aerial survey has become an indispensable means of obtaining surveying and mapping image data. Compared with traditional aerial photography, UAV aerial survey has the advantages of low cost, flexibility, and high image spatial resolution, and plays an important role in engineering survey and construction. With the advancement of the large-scale speed-up and reconstruction project of China's railways, the survey tasks of the existing railway lines have been gradually increasing. Generally, the surveying and mapping tasks of existing railway lines include topographic surveying and mapping, plane surveying and mapping, leveling surveying, cross-section surveying and mapping, station surveying and mapping, etc. One of the core steps is to obtain accurate plane and elevation coordinates of the line centerline, that is, to obtain high-precision 3D coordinates of the line.

At present, there are three main ways to obtain 3D centerlines of existing railways. (1) Total station and GPS-RTK measurement. This method can meet the accuracy requirements of the existing line surveying and mapping, but the efficiency is low, and on-site manual operation is required, accompanied with high safety risk. (2) Traditional large aircraft aerial photography surveying and mapping. This method only needs to manually collect track points on the aerial camera stereo pair to obtain the coordinates of the railway centerline, avoiding manual online operation, but its disadvantage is that the measurement accuracy is low (5~10 cm), especially that the accuracy in the elevation direction often does not meet the actual needs. (3) Rail on-board lidar surveying and mapping. This method can directly obtain high-precision coordinate data of track points, but the disadvantages are the needs of on-site measurement and requiring large amount of communication and coordination work with the operating unit. Overall, the three existing methods have their own characteristics, but none of them can simultaneously take into account the two requirements of off-line and high precision.

Aiming at the difficulty in the on-site surveying and mapping of existing railway lines, the present application proposes a method of high-precision 3D reconstruction of existing railway track lines based on UAV multi-view images, which can obtain high-precision elevation geographic coordinates of a railway track line plane without manual on-site operation, thereby providing high-precision basic data for subsequent line reconstruction and operation and maintenance.

SUMMARY

Therefore, an objective of the present application is to provide a method of high-precision 3D reconstruction of existing railway track lines based on UAV multi-view images. Based on the multi-view geometry principle in computer vision and photogrammetry, object space coordinates of lines (plane and elevation accuracy of about 2 cm) can be directly calculated by using image information, which does not require outdoor workers to work on-site and can effectively improve the safety of railway operation line surveying and mapping. Therefore, this method has important engineering application value and application prospect.

In order to achieve the above objective, a method of high-precision 3D reconstruction of existing railway track lines based on UAV multi-view images according to the present application includes: S1, acquiring initial data including original images from UAV multi-view, external azimuth elements of the images, internal parameters of camera, and initial coordinates of a rail top centerline; S2, back-projecting the initial coordinates of the rail top centerline to the original image using the image external azimuth elements and the internal parameters of camera, and adjusting a location of an image straight segment to obtain a precise image rail top centerline observation value; S3, optimizing the image rail top centerline observation value using a nonlinear least squares method to obtain an object space coordinate parameter of a rail top straight segment, and connecting adjacent straight segments in sequence using the object space coordinate parameter to obtain complete 3D coordinates of the rail top centerline; and S4, distinguishing between rail straight and curved segments according to the obtained 3D coordinates of the rail top centerline, and calculating 3D centerline coordinates of each segment in turn to obtain high-precision 3D coordinates of the rail top centerline.

In an embodiment, to back-project the initial coordinates of the rail top centerline to the original image in S2, the method comprises segmenting an initial rail top centerline input according to a preset length threshold to obtain a plurality of straight segments of the rail top centerline, and back-projecting the rail top straight segments as segmented to the original image from UAV multi-view according to a collinear condition equation using the precise image external azimuth elements and internal parameters of camera to obtain a rough location of each rail top straight segment on the image.

In an embodiment, the step of adjusting the location of the image straight segment in S2 comprises finely adjusting an endpoint location of the image straight segment so that each image rail straight segment is accurately located on the rail top centerline.

In an embodiment, in S3, the step of optimizing the image rail top centerline observation value using the nonlinear least squares method to obtain the object space coordinate parameter of the rail top straight segment comprises: for the straight segments of the rail top centerline, calculating an included angle between each two image projection planes as an intersection angle, and taking an object space straight segment formed by an intersection of two image projection planes with the largest intersection angle as an initial value of least squares adjustment of the straight segment; taking an Euclidean distance between a back-projected straight segment of the rail top straight segment as the initial value on the image and a corresponding image line observation value as a cost to form a cost equation; calculating an overall cost function of least squares optimization of any object space rail top straight segment according to the cost equation; performing Taylor series expansion on the overall cost function, and omitting higher-order terms to obtain a linearized error equation; and solving the object space coordinate parameter of the rail top straight segment using the linearized error equation according to least squares adjustment criterion.

In an embodiment, for any object space rail top straight segment $L_i$, if it has image line observation values on a plurality of images, several cost equations are formed, and an overall cost function of least squares optimization of the straight segment $L_i$ is:

$$C = \sum_k dist(proj(L_i, T_k), l_{ik})$$

where C represents an overall back-projection cost of the least squares optimization of the straight segment $L_i$, dist(*) is an Euclidean distance function from an observed value of the image line to the back-projection straight segment of the rail top straight segment, proj(*) represents a back-projection function based on perspective imaging, $T_k$ is internal and external azimuth elements of the k-th image where $L_i$ is observable, and $l_{ik}$ represents an image straight segment observation value corresponding to $L_i$ on this image.

In an embodiment, in S3, the step of connecting adjacent straight segments in sequence using the object space coordinate parameter to obtain the complete 3D coordinates of the rail top centerline comprises: taking a point on the obtained rail top straight segment that is closest to a projected ray of an image line endpoint as a homologue point as the endpoint on the rail top straight segment, calculating coordinates of homologue points as all image line endpoints on the rail top straight segment, and taking an average value thereof as an endpoint of the rail top straight segment; and determining a corresponding connection sequence according to starting and ending coordinates of each segment, and calculating an average value of coordinates of endpoints of adjacent rail top straight segments that are close to each other as coordinates of a rail node, so as to realize connection of the adjacent straight segments and obtain the complete rail top centerline.

In an embodiment, in S4, the step of distinguishing between the rail straight and curved segments according to the obtained 3D coordinates of the rail top centerline comprises: for the obtained rail top centerline, calculating an azimuth angle of each segment by taking the rail node as a distinguishing point, and counting minimum and maximum azimuth angles; forming a rectangular slice space by taking a preset threshold δ as a search width, and counting a number N of rail nodes falling into the rectangular slice space; if N is greater than the preset threshold, determining that the rail nodes in the rectangular slice space are all straight segment points; otherwise, determining that the rail nodes in the rectangular slice space are curved segment points; and moving the rectangular slice space upward by a distance of δ/2 by taking a minimum value as a starting point, and continuing to determine the straight/curved segment point until the rectangular slice space reaches the maximum azimuth angle.

In an embodiment, in S4, the step of calculating the 3D centerline coordinates of each segment in turn to obtain the high-precision 3D coordinates of the rail top centerline comprises: if it is a straight segment, for each node $P_{G1}$ on the straight segment, calculating a point $P_{G2}$ closest to $P_{G1}$ on $G_2$, and calculating a midpoint of $P_{G1}$ and $P_{G2}$ as a node of the 3D centerline; and performing the above operations by traversing all nodes on the rail $G_1$ to obtain a 3D centerline of the straight segment.

In an embodiment, in S4, the step of calculating the 3D centerline coordinates of each segment in turn to obtain the high-precision 3D coordinates of the rail top centerline comprises: if it is a curved segment, for each inner rail node $P_N(X_P, Y_P, Z_P)$, first calculating azimuth angles $\alpha_1$ and $\alpha_2$ in a normal direction of two straight segments before and after the node on a two-dimensional plane, and offsetting a plane point $P_T(X_P, Y_P)$ along a direction of $(\alpha_1+\alpha_2)/2$ to the inside of the rail by a distance d=(1.435+ϑ)/2, where ϑ is a width of the rail top, to obtain coordinates $(X_S, Y_S)$ as follows:

$$\begin{cases} X_S = X_P + d*\sin\left(\dfrac{\alpha_1 + \alpha_2}{2}\right) \\ Y_S = Y_P + d*\cos\left(\dfrac{\alpha_1 + \alpha_2}{2}\right) \end{cases}$$

an elevation $Z_P$ of a corresponding inner rail point is used as an elevation value of a 3D centerline node of the curve segment to obtain coordinates $(X_S, Y_S, Z_P)$ of a 3D centerline node corresponding to the point $P_N$.

Compared with the prior art, the method of high-precision 3D reconstruction of existing railway track lines based on UAV multi-view images according to the present application has at least the following advantages:

1. The present application utilizes an internal geometric relationship of a multi-view image area network to reconstruct a track directly based on results of image aerial triangulation orientation, avoiding errors introduced by the orthophoto and the 3D model making process. The present application can achieve a higher calculation accuracy of the rail top centerline (both plane and elevation accuracy can reach about 2 cm), which can fully meet the precision requirements of existing line surveying and mapping.

2. The present application designs a rail straight/curved segment determination method based on a rectangular slice space, which can accurately classify track points into straight/curved segment points, thereby ensuring the calculation accuracy of the 3D coordinates of the rail top centerline.

3. Compared with the existing line measurement methods (GPS/RTK measurement, large aircraft aerial photography and on-board lidar), this method takes into account two advantages of offline measurement and high precision at the same time, which effectively improves the operation efficiency and safety and has a great practical and promotional value.

DETAILED DESCRIPTION OF THE EMBODIMENTS

The present application will be further described in detail below through the accompanying drawings and specific embodiments.

Figure 1:
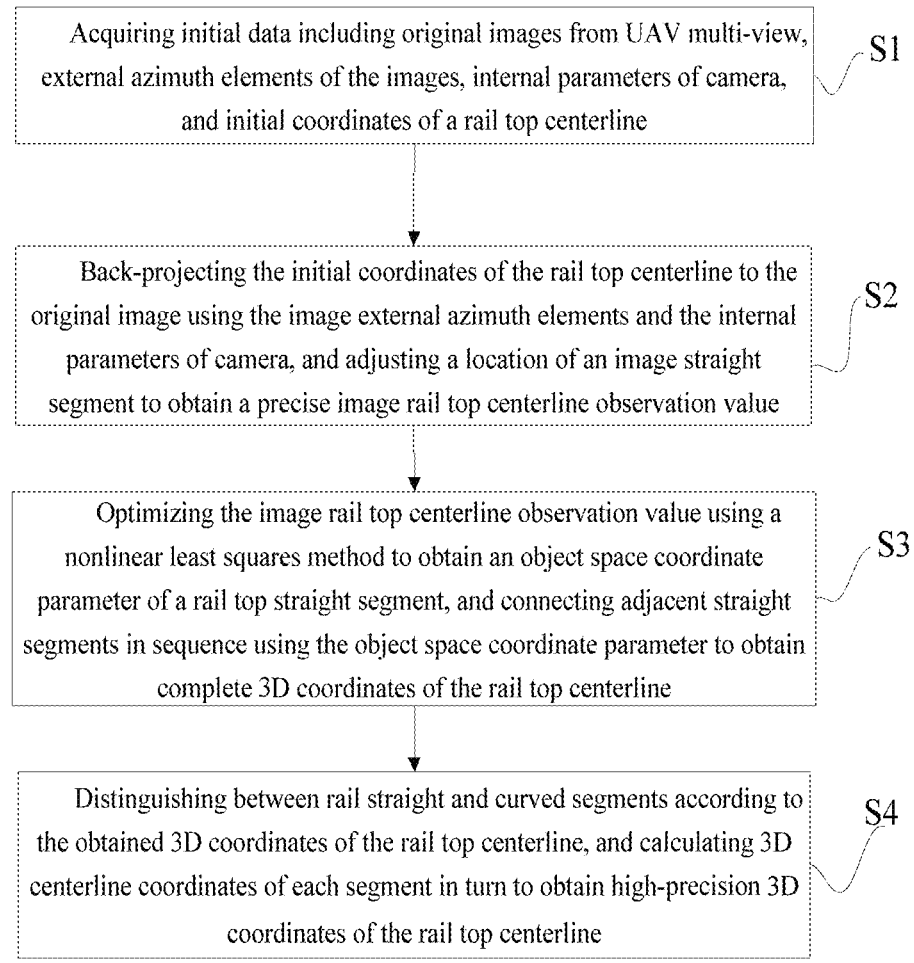
FIG. 1 is a flowchart of a method of high-precision 3D reconstruction of existing railway track lines based on UAV multi-view images according to an embodiment of the present application.

As shown in FIG. 1, an embodiment of the present application provides a method of high-precision 3D reconstruction of existing railway track lines based on UAV multi-view images. The method includes the following steps.

In S1, initial data is acquired. The initial data can include an original image from UAV multi-view, image external azimuth elements, internal parameters of camera (the results of aerial triangulation orientation), and initial coordinates of a rail top centerline.

Figure 2:
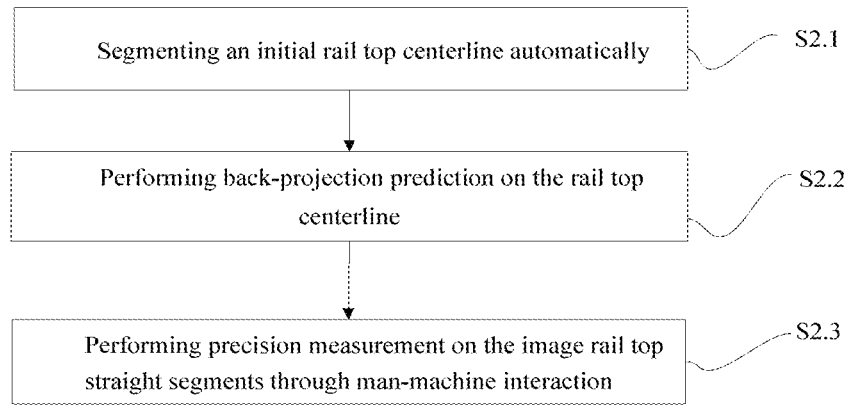
FIG. 2 is a flowchart showing a process of obtaining a UAV image rail top centerline according to an embodiment of the present application.

In S2, a UAV image rail top centerline is acquired. The initial coordinates of the rail top centerline are back-projected to the original image using the image external azimuth elements and the internal parameters of camera, and fine location adjustment is performed on an image straight segment in a way of man-machine interaction to obtain a precise image rail top centerline observation value. As shown in FIG. 2, the step can be implemented as follows.

In S2.1, the rail top centerline is automatically segmented. An initial rail top centerline as input is segmented according to a preset length threshold (usually set as 10~15 m) to obtain a plurality of straight segments of the rail top centerline.

In S2.2, back-projection prediction is performed on the rail top centerline. Based on a collinear condition equation, the rail top straight segments as segmented in step 2.1 are back-projected to the UAV image using the precise image external azimuth elements and internal parameters of camera to obtain rough locations of the rail top straight segments on the image.

In S2.3, precision measurement is performed on the image rail top straight segments by means of man-machine interaction. Locations of endpoints of image straight segments are finely adjusted by means of man-machine interaction according to the rough locations of the rail top straight segments obtained in S2.2 to ensure that each image rail straight segment is accurately located on the rail top centerline.

Figure 3:
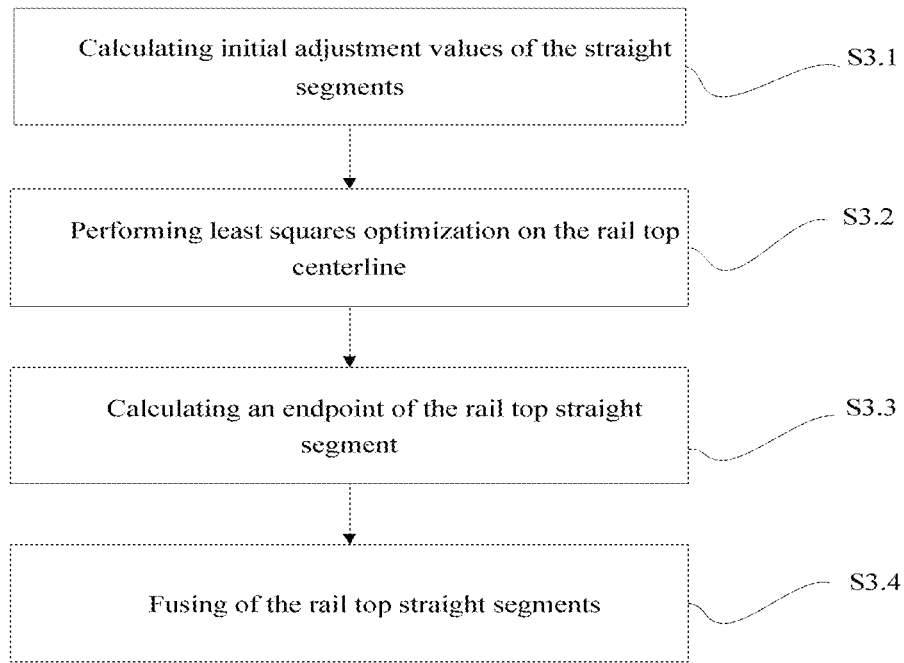
FIG. 3 is a flowchart showing a process of calculating the rail top centerline based on a nonlinear least squares method according to an embodiment of the present application.

In S3, the rail top centerline is calculated based on a nonlinear least squares method. Object-space coordinate parameters of the rail top straight segments are optimized using the nonlinear least squares method by taking the image rail top straight segments obtained in S2 as observation values, and adjacent straight segments are connected in sequence to form a complete rail top centerline. As shown in FIG. 3, the step can be implemented as follows.

In S3.1, initial adjustment values of the straight segments are calculated. For the rail top straight segments, an included angle between each two image projection planes (a plane formed by the photography center and the image rail line) is calculated as an intersection angle, and an object-space straight segment formed by an intersection of two image projection planes with the largest intersection angle is used as an initial value of least squares adjustment of the straight segment. Object-space straight segments are described in a point-direction manner in the present application. If coordinates of a point on a straight segment L is $[X, Y, Z]^T$, and a unit direction vector of the straight segment is $[u, v, \sqrt{1-u^2-v^2}]^T$, then the object-space parameter of the straight segment is $L=[X, Y, Z, u, v]^T$.

Figure 4:
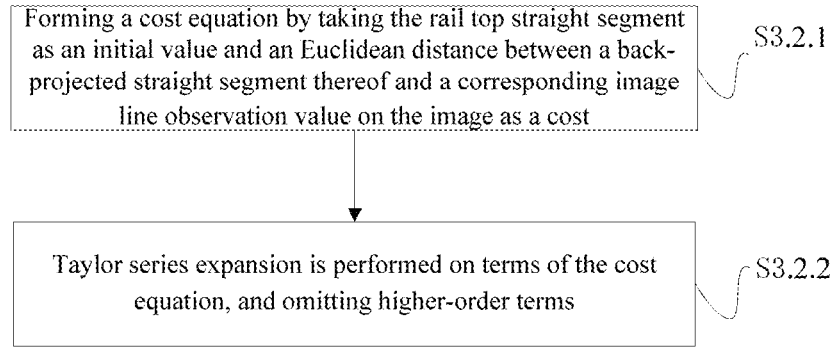
FIG. 4 is a flowchart showing a process of performing least squares optimization on the rail top centerline according to an embodiment of the present application.

In S3.2, least squares optimization is performed on the rail top centerline. As shown in FIG. 4, in an embodiment, the step can be implemented as follows.

In S3.2.1, taking the rail top straight segment obtained in S3.1 as an initial value, an Euclidean distance between a back-projected straight segment thereof on the image and a corresponding image line observation value is taken as a cost to form a cost equation. The calculation method of the cost value is as follows: if the parameter of the straight segment is $l=[X, Y, Z, u, t, w]^T$, the coordinate of the projection center is $[X_S, Y_S, Z_S]^T$, $a_i$, $b_i$ and $c_i$ (i=1, 2, 3) are element values in a photogrammetry rotation matrix, f is a focal length, $x_0$ and $y_0$ are coordinates of the principal point of the image, and two endpoints of the rail top image line l are respectively $p=[x_p, y_p]^T$ and $q=[x_q, y_q]^T$, then the calculation equation of the cost value of point p is as follows:

$$d_p = \frac{x_P A_1 - y_P A_2 + \frac{f^2(B_3(a_2(X-X_S)+b_2(Y-Y_S)+C_2(Z-Z_S))-B_1(a_1(X-X_S)+b_1(Y-Y_S)+C_1(Z-Z_S)))}{B_2 B_4}}{\sqrt{A_1^2 + A_2^2}} \quad (1)$$

In equation (1), variable symbols are defined as follows:

$$A_1 = f\left(a_2(X-X_S)+b_2(Y-Y_S)+\frac{C_2(Z-Z_S)}{B_4}-\frac{B_1}{B_2}\right) \quad (2)$$

$$A_2 = f\left(a_1(X-X_S)+b_1(Y-Y_S)+\frac{C_1(Z-Z_S)}{B_4}-\frac{B_3}{B_2}\right)$$

$$B_1 = a_2 C_3 + b_2 C_2 + c_2 C_1$$

$$B_2 = a_3 C_3 + b_3 C_2 + c_3 C_1$$

$$B_3 = a_1 C_3 + b_1 C_2 + c_1 C_1$$

$$B_4 = a_3(X-X_S)+b_3(Y-Y_S)+C_3(Z-Z_S)$$

$$C_1 = Z - Z_S + \omega$$

$$C_2 = Y - Y_S + v$$

$$C_3 = X - X_S + u$$

Figure 7:
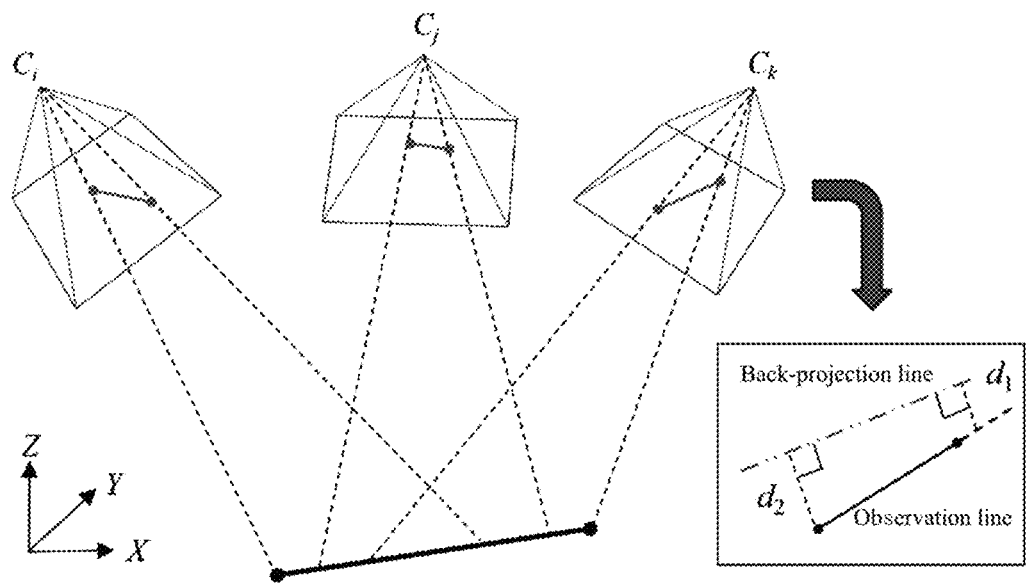
FIG. 7 is a schematic diagram of least squares optimization of a rail top centerline of the method of high-precision 3D reconstruction of existing railway track line based on UAV multi-view images according to an embodiment of the present application.

Similarly, a cost value $d_q$ of point q can be calculated, and then the cost value of the rail top image line is $(d_p+d_q)/2$. As shown in FIG. 7, $L_O$ is an image line observation value, $L_P$ is a back-projection line of a corresponding object space line on the image, and then the cost value is $(d_1+d_2)/2$. For the object space rail top straight segment $L_i$, if it has image line observation values on a plurality of images, several cost equations described in equations (1) and (2) can be formed, and then the overall cost function of the least squares optimization of the straight segment $L_i$ is:

$$C = \sum_k dist(proj(L_i, T_k), l_{ik}) \qquad (3)$$

In equation (3), C represents an overall back-projection cost of the least squares optimization of the straight segment $L_i$, dist(*) is an Euclidean distance function from an observed value of the image line to the back-projection straight segment of the rail top line, proj(*) represents a back-projection function based on perspective imaging, $T_k$ is internal and external azimuth elements of the k-th image where $L_i$ can be observed, and $l_{ik}$ represents an image straight segment observation value corresponding to $L_i$ on the image.

In S3.2.2, Taylor series expansion is performed on terms of equation (3), and higher-order terms are omitted. An error equation after linearization is as follows:

$$V_L = A_L l - b_L, \ P_L \qquad (4)$$

In equation (4), $V_L$ is a back-projection residual distance of the rail top straight segment, $l=[\Delta X_s, \Delta Y_s, \Delta Z_s, \Delta u, \Delta v]^T$ is a correction number vector of the parameter of the rail top straight segment, $P_L$ is a first-order partial derivative matrix of an objective function with respect to a straight segment parameter vector, $b_L$ is a constant vector, and $P_L$ is a unit weight matrix. According to least squares adjustment criterion, the parameter of the rail top straight segment is accurately solved.

In S3.3, an endpoint of the rail top straight segment is calculated. Specifically, a point on the rail top straight segment obtained in S3.2 that is closest to a projected ray of an image line endpoint is calculated as a homologue point as the endpoint on the rail top straight segment. Coordinates of homologue points as all image line endpoints on the rail top straight segment are calculated, and an average value thereof is taken as an endpoint of the rail top straight segment.

In S3.4, the rail top straight segments are fused. For the rail top straight segments obtained in S3.3, a corresponding connection sequence is determined according to starting and ending coordinates of each segment. An average value of coordinates of endpoints of adjacent rail top straight segments that are close to each other is calculated as coordinates of a rail node, so as to realize connection of adjacent straight segments and obtain the complete rail top centerline.

Figure 5:
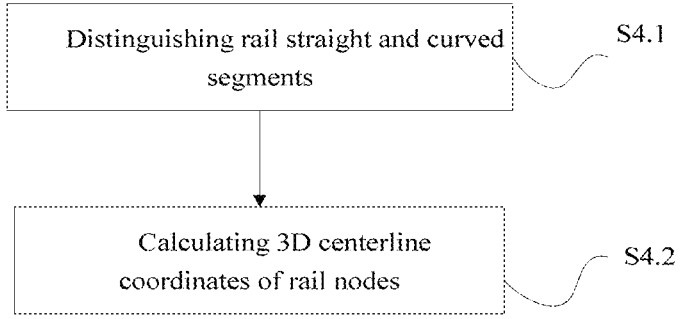
FIG. 5 is a flowchart showing a process of calculating high-precision 3D coordinates of the rail top centerline according to an embodiment of the present application.

In S4, rail straight and curved segments are distinguished according to the obtained 3D coordinates of the rail top centerline, and 3D centerline coordinates of each segment are calculated in turn to obtain high-precision 3D coordinates of the rail top centerline. As shown in FIG. 5, in an embodiment, the step can be realized as follows.

Figure 6:
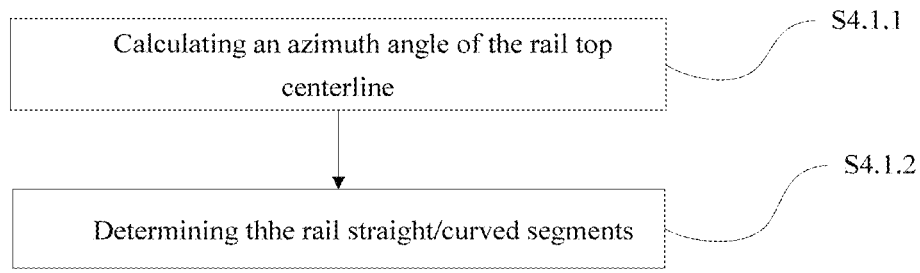
FIG. 6 is a flowchart showing a process of distinguishing rail straight and curved segments according to an embodiment of the present application.

In S4.1, rail straight and curved segments are distinguished as follows:

Referring to FIG. 6, in S4.1.1, an azimuth angle of the rail top centerline is calculated. For the rail top centerline obtained in S3, an azimuth angle of each segment is calculated with the node as a distinguishing point, and the minimum azimuth angle $\beta_{min}$ and the maximum azimuth h angle $\beta_{max}$ are counted.

Figure 8:
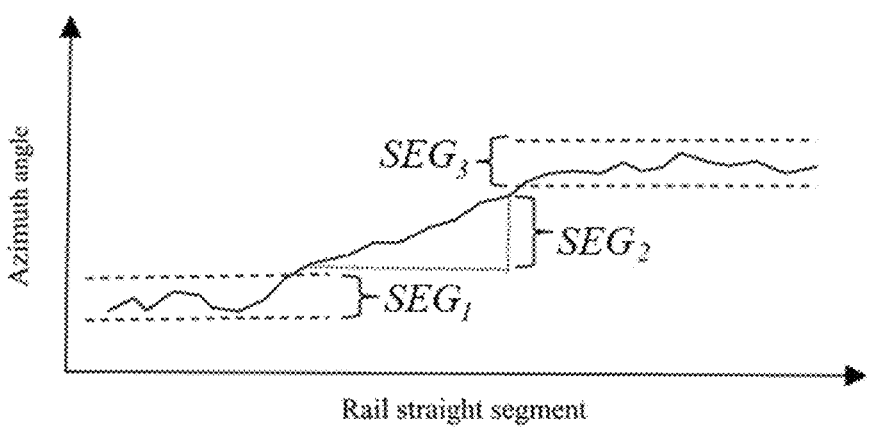
FIG. 8 is a schematic diagram of rail straight/curved segment determination of the method of high-precision 3D reconstruction of existing railway track lines based on UAV multi-view images according to an embodiment of the present application.

In S4.1.2, the rail straight/curved segments are determined. Taking $\beta_{min}$ obtained in S4.1.1 as the starting point and a preset threshold $\delta$ as a search width, a rectangular slice space is formed, and a number N of rail nodes falling into the rectangular slice space is counted. If $N>N_{min}$, it is determined that the rail nodes in the rectangular slice space are all straight segment points; otherwise, it is determined that the rail nodes in the rectangular slice space are curved segment points. As shown in FIG. 8, the horizontal axis represents the rail straight segment, and the vertical axis represents the azimuth angle corresponding to the straight segment. The points in areas $SEG_1$ and $SEG_3$ are straight segment points, and the points in area $SEG_2$ are curved segment points. The rectangular slice space is moved up a distance $\delta/2$, and straight/curved segment points are continued to be determined according to the above method till the minimum value of the rectangular slice space reaches the maximum value of the azimuth angle to end this step.

In S4.2, 3D centerline coordinates of rail nodes are calculated. In S4.1, the rail nodes are divided into several straight segments and curved segments, and for nodes of each rail segment, the 3D centerline coordinates of each segment are calculated in turn. Assuming that two rails of the track are $G_1$ and $G_2$ respectively, the 3D centerline are calculated as follows:

(a) If it is a straight segment, for each node $P_{G1}$ on the straight segment, a point $P_{G2}$ closest to $P_{G1}$ on $G_2$ is calculated, and a midpoint of $P_{G1}$ and $P_{G2}$ is calculated as a node of the 3D centerline; and all nodes on the rail $G_1$ are traversed and the above operations are performed to obtain a 3D centerline of the straight segment.

(b) If it is a curved segment, for each inner rail node $P_N$ ($X_P$, $Y_P$, $Z_P$), azimuth angles $\alpha_1$ and $\alpha_2$ in a normal direction of two straight segments before and after the node on a two-dimensional plane are first calculated, and a plane point $P_T$ ($X_P$, $Y_P$) is offset along a direction of $(\alpha_1+\alpha_2)/2$ to the inside of the rail by a distance $d=(1.435+\vartheta)/2$, where $\vartheta$ is a width of the rail top, to obtain coordinates ($X_S$, $Y_S$) as follows:

$$\begin{cases} X_S = X_P + d * \sin\left(\dfrac{\alpha_1 + \alpha_2}{2}\right) \\ Y_S = Y_P + d * \cos\left(\dfrac{\alpha_1 + \alpha_2}{2}\right) \end{cases} \qquad (5)$$

In step 4.2 (b), an elevation $Z_P$ of a corresponding inner rail point is used as an elevation value of the 3D centerline node of the curved segment to obtain the 3D centerline node coordinates ($X_S$, $Y_S$, $Z_P$) corresponding to the point $P_N$.

The 3D centerline coordinates of the entire rail can be obtained by processing the straight and curved segments of the rail according to the above methods (a) and (b). Combining the 3D coordinates of the rail top centerline obtained in step 3, the complete 3D coordinates of the rail can be obtained.

Obviously, the above-mentioned embodiments are only examples for clarity only, but not for limiting. Those skilled in the art can also make other changes or alterations in different forms on the basis of the above description. It is not necessary or possible to exhaust all embodiments here. The obvious changes or alterations derived therefrom still belong to the scope of protection of the present application.

What is claimed is:

1. A method of high-precision three-dimensional (3D) reconstruction of existing railway track lines based on unmanned aerial vehicle (UAV) multi-view images, comprising:
- S1, acquiring initial data comprising original images from UAV multi-view, external azimuth elements of the images, internal parameters of camera, and initial coordinates of a rail top centerline;
- S2, back-projecting the initial coordinates of the rail top centerline to the original images using the image external azimuth elements and the internal parameters of camera, and adjusting a location of an image straight segment to obtain a precise image rail top centerline observation value;
- S3, optimizing the image rail top centerline observation value using a nonlinear least squares method to obtain an object space coordinate parameter of a rail top straight segment, and connecting adjacent straight segments in sequence using the object space coordinate parameter to obtain complete 3D coordinates of the rail top centerline; and
- s of the rail top centerline; and
- S4, distinguishing between rail straight and curved segments according to the obtained 3D coordinates of the rail top centerline, and calculating 3D centerline coordinates of each segment in turn to obtain high-precision 3D coordinates of the rail top centerline, wherein in S4, the distinguishing between the rail straight and curved segments according to the obtained 3D coordinates of the rail top centerline comprises:
- for the obtained rail top centerline, calculating an azimuth angle of each segment by taking the rail node as a distinguishing point, and counting minimum and maximum azimuth angles;
- forming a rectangular slice space by taking a preset threshold $\delta$ as a search width, and counting a number N of rail nodes falling into the rectangular slice space;
- if N is greater than the preset threshold, determining that the rail nodes in the rectangular slice space are all straight segment points; otherwise, determining that the rail nodes in the rectangular slice space are curved segment points; and
- moving the rectangular slice space upward by a distance of $\delta/2$ by taking a minimum value as a starting point, and continuing to determine the straight/curved segment point until the rectangular slice space reaches the maximum azimuth angle.

2. The method according to claim 1, wherein the back-projecting the initial coordinates of the rail top centerline to the original images in S2 comprises:
- segmenting an initial rail top centerline input according to a preset length threshold to obtain a plurality of straight segments of the rail top centerline; and
- back-projecting the rail top straight segments as segmented to the original images from UAV multi-view according to a collinear condition equation using the precise image external azimuth elements and internal parameters of camera to obtain a rough location of each rail top straight segment on the image.

3. The method according to claim 2, wherein in S2, the adjusting the location of the image straight segment comprises finely adjusting an endpoint location of the image straight segment so that each image rail straight segment is accurately located on the rail top centerline.

4. The method according to claim 2, wherein in S3, the optimizing the image rail top centerline observation value using the nonlinear least squares method to obtain the object space coordinate parameter of the rail top straight segment comprises: for the straight segments of the rail top centerline, calculating an included angle between each two image projection planes as an intersection angle, and taking an object space straight segment formed by an intersection of two image projection planes with the largest intersection angle as an initial value of least squares adjustment of the straight segment;
- the largest intersection angle as an initial value of least squares adjustment of the straight segment;
- intersection angle as an initial value of least squares adjustment of the straight segment;
- taking an Euclidean distance between a back-projected straight segment of the rail top straight segment as the initial value on the image and a corresponding image line observation value as a cost to form a cost equation;
- calculating an overall cost function of least squares optimization of any object space rail top straight segment according to the cost equation;
- performing Taylor series expansion on the overall cost function, and omitting higher-order terms to obtain a linearized error equation; and
- solving the object space coordinate parameter of the rail top straight segment using the linearized error equation according to least squares adjustment criterion.

5. The method according to claim 4, wherein, for any object space rail top straight segment $L_i$, if it has image line observation values on a plurality of images, several cost equations are formed, and an overall cost function of least squares optimization of the straight segment $L_i$ is:

$$C = \sum_k dist(proj(L_i, T_k), l_{ik})$$

where C represents an overall back-projection cost of the least squares optimization of the straight segment $L_i$, dist (*) is an Euclidean distance function from an observed value of the image line to the back-projection straight segment of the rail top straight segment, prof (*) represents a back-projection function based on perspective imaging, $T_k$ is internal and external azimuth elements of the k-th image where $L_i$ is observable, and $l_{ik}$ represents an image straight segment observation value corresponding to $L_i$ on this image.

6. The method according to claim 2, wherein, in S3, the connecting adjacent straight segments in sequence using the object space coordinate parameter to obtain the complete 3D coordinates of the rail top centerline comprises:
- taking a point on the obtained rail top straight segment that is closest to a projected ray of an image line endpoint as a homologue point as the endpoint on the rail top straight segment, calculating coordinates of homologue points as all image line endpoints on the rail top straight segment, and taking an average value thereof as an endpoint of the rail top straight segment; and
- determining a corresponding connection sequence according to starting and ending coordinates of each segment, and calculating an average value of coordinates of endpoints of adjacent rail top straight segments that are close to each other as coordinates of a rail node, so as to realize connection of the adjacent straight segments and obtain the complete rail top centerline.

7. The method according to claim 1, wherein two rails of a track are represented as $G_1$ and $G_2$ respectively, and in S4, the calculating the 3D centerline coordinates of each segment in turn to obtain the high-precision 3D coordinates of the rail top centerline comprises:

if the segment is a straight segment, for each node $P_{G1}$ on the straight segment, calculating a point $P_{G2}$ on the $G_2$ closest to $P_{G1}$, and calculating a midpoint of $P_{G1}$ and $P_{G2}$ as a node of the 3D centerline; and performing such operation for all nodes on the $G_1$ to obtain a 3D centerline of the straight segment.

8. The method according to claim 1, wherein in S4, the calculating the 3D centerline coordinates of each segment in turn to obtain the high-precision 3D coordinates of the rail top centerline comprises:

if the segment is a curved segment, for each inner rail node $P_N(X_P, Y_P, Z_P)$, first calculating azimuth angles $\alpha_1$ and $\alpha_2$ in a normal direction of two straight segments before and after the node on a two-dimensional plane, and offsetting a plane point $P_T(X_P, Y_P)$ along a direction of $(\alpha_1+\alpha_2)/2$ to the inside of the rail by a distance $d=(1.435+\vartheta)/2$, where $\vartheta$ is a width of the rail top, to obtain coordinates $(X_S, Y_S)$ as follows:

$$\begin{cases} X_S = X_P + d * \sin\left(\dfrac{\alpha_1 + \alpha_2}{2}\right) \\ Y_S = Y_P + d * \cos\left(\dfrac{\alpha_1 + \alpha_2}{2}\right) \end{cases}$$

an elevation $Z_P$ of a corresponding inner rail point is used as an elevation value of a 3D centerline node of the curve segment to obtain coordinates $(X_S, Y_S, Z_P)$ of a 3D centerline node corresponding to the point $P_N$.

* * * * *